United States Patent
Matsuda (10) Patent No.: US 7,591,174 B2
(45) Date of Patent: Sep. 22, 2009

(54) RUDDER ANGLE SENSOR

(75) Inventor: Masahiro Matsuda, Tsurugashima (JP)

(73) Assignee: Toyo Denso Kabushiki Kaisha, Minato-ku (JP)

( * ) Notice: Subject to any disclaimer, the term of this patent is extended or adjusted under 35 U.S.C. 154(b) by 382 days.

(21) Appl. No.: 11/553,021

(22) Filed: Oct. 26, 2006

(65) Prior Publication Data

US 2007/0102226 A1    May 10, 2007

(30) Foreign Application Priority Data

Nov. 8, 2005    (JP) .............................. 2005-323255

(51) Int. Cl.
G01M 17/06    (2006.01)
(52) U.S. Cl. .................................................. 73/117.02
(58) Field of Classification Search .............. 73/117.01, 73/117.02, 117.03, 1.75; 116/31
See application file for complete search history.

(56) References Cited

U.S. PATENT DOCUMENTS

| 6,445,984 B1 | 9/2002 | Kellogg |
| 6,870,470 B2 * | 3/2005 | Nomura et al. .............. 340/441 |
| 7,424,858 B2 * | 9/2008 | Matsuda et al. .......... 114/144 E |
| 2003/0020461 A1 | 1/2003 | Nomura et al. |
| 2004/0118220 A1 | 6/2004 | Takuma |
| 2008/0009993 A1 * | 1/2008 | Matsuda et al. ................ 701/41 |

FOREIGN PATENT DOCUMENTS

| EP | 1 522 486 A2 | 4/2005 |
| JP | 2004-198287 | 7/2004 |
| WO | 99/08374 | 2/1999 |

* cited by examiner

Primary Examiner—Eric S McCall
(74) Attorney, Agent, or Firm—Burr & Brown (57) ABSTRACT

A rudder angle sensor with high accuracy, including a memory for storing a correction value to correct a rotational delay of a driven gear relative to a main drive gear caused by a backlash at a time of reverse of a steering shaft, a computer for correcting the value measured by the measuring mechanism based on the correction value stored in the memory, to thereby, calculate the rotation angle of the steering shaft. The measured result of the driven gear obtained by the measuring mechanism is corrected based on the correction value, and therefore, the backlash existing between the main drive gear and the driven gear can be matched completely or approximately. Thus, the high accuracy angle sensor is realized.

2 Claims, 12 Drawing Sheets

RUDDER ANGLE SENSOR

BACKGROUND OF THE INVENTION

1. Field of the Invention

The present invention relates to a rudder angle sensor detecting a rotation angle of a steering shaft mounted on a vehicle such as an automobile.

2. Description of the Related Art

As a rudder angle sensor which is known up to now (hereinafter, referred to as "conventional rudder angle sensor"), for example, there is the one disclosed in Patent Document 1. The conventional rudder angle sensor is constituted by including a first gear interlocked with a steering shaft to rotate and a second gear interlocked with the first gear and rotating in higher speed than the first gear. Generally, it is required for a rudder angle sensor including the conventional rudder angle sensor to detect a rotation angle of the steering shaft with high accuracy. Therefore, usually a third gear engaging with the first gear is provided in the conventional rudder angle sensor as means to accomplish the requirement.

[Patent document 1] Japanese Patent Application Laid-open No. 2004-198287 (refer to Paragraph Number 0016, FIG. 3)

However, it is well known that a backlash (play) is necessary between gears to rotate paired gears smoothly and easily. Here, a case is considered when a steering shaft is, for example, rotated in a counterclockwise direction under a state that it is rotated for a predetermined angle in a clockwise direction, namely the case when it is reversed. As a more concrete example, the above-stated angle when it is reversed is assumed to be a position of three o'clock of a clock. That is, a state is assumed, in which the steering shaft is rotated in the clockwise direction, then the rotation is stopped when it reaches the position of three o'clock passing through the positions of one o'clock and two o'clock, and it is rotated in one o'clock direction which is a reverse direction from the position of three o'clock where it is stopped. Teeth of the first gear (interlocked with a steering shaft) and teeth of the third gear are in contact state while it is rotated from passing over the position of one o'clock to reaching the position of three o'clock, and therefore, the backlash between both gears does not become a problem. This is because the third gear conforms to the rotation of the first gear to be interlocked to rotate. Meantime, the third gear when it is reversed to head in one o'clock direction does not start to conform to the rotation of the first gear immediately. The third gear conforms to the first gear behind for the extent of the above-stated backlash. Namely, the steering shaft is reversed from the position of three o'clock to one o'clock direction, and then, the first gear is reversed with conforming to the steering shaft. However, the third gear engaging with the first gear does not start to rotate until the steering shaft comes to, for example, the position of two o'clock if figuratively speaking. This is a rotational delay caused by the backlash, namely, a rotational displacement or discrepancy. Such naturally arising rotational discrepancy prevents a high accurate detection of the rotation angle of the steering shaft. For example, there are a doubling structure in which two gears are overlapped and one gear is displaced in a rotational direction to adjust, a doubling structure in which a gear with a twist such as a helical gear is divided into two pieces, and one piece is displaced in the rotational direction to adjust, and so on, as the known methods to reduce the backlash. However, a requirement for the rudder angle sensor to be lighter and more compact is extremely strong as a steering structure disposed inside of a limited space of a vehicle complicates. Consequently, it is generally impossible to make the gear for detecting the rudder angle doubling structure and so on to prevent the backlash, because it leads to a large sizing of the rudder angle sensor. A problem to be solved by the present invention is to provide a rudder angle sensor maintaining a small size as much as possible and having high accuracy. Namely, it is to provide the rudder angle sensor with high accuracy while avoiding leading to the large size, by eliminating a detection error caused by the backlash existing between the gears in the rudder angle sensor including the paired gears.

SUMMARY OF THE INVENTION

The inventor advancing development to solve the above-stated problems comes to an idea that a rotational delay of a driven gear caused by a backlash is compensated by a correction, and thereby, it becomes possible to further heighten an accuracy of a rotation angle detection of a main drive gear (steering shaft). A large sizing of the rudder angle sensor can be then avoided because it is not necessary to add any modification on gears or a peripheral structure of the gear. The present invention is made from the above-stated point of view. Detailed constructions will be described in later sections. It should be noted that definitions or the like of terms for explaining any aspect of the invention also apply to other aspects of the inventions within possible ranges of their nature.

First Aspect of the Invention

A rudder angle sensor according to a first aspect of the invention (hereinafter, referred to as "rudder angle sensor of the first aspect) is constituted by including a reversibly rotatable main drive gear interlocked with a steering shaft, a driven gear driven by engaging with the main drive gear, a measuring mechanism measuring a rotation angle of the driven gear, and a calculation means calculating the rotation angle of the steering shaft based on a measured result of the measuring mechanism. Concerning a relation between the main drive gear and the driven gear, it is general that the rotation angle of the steering shaft being an object of detection is made to be decelerated, namely, the number of teeth of the driven gear is made to be smaller than the number of teeth of the main drive gear so that the detection can be performed easily, but it may be constituted in a reverse manner from the above. Here, a backlash exists at least between the main drive gear and the driven gear. There is no limitation in a structure of the measuring mechanism, but there is a case when the measuring mechanism in itself includes a gear (gear group) integrally rotating with the driven gear, and further, a gear (gear group) engaging with this gear (gear group). In such a case, the backlash also exists between the engaging gears. In the rudder angle sensor of the first aspect, a storage means capable of storing a correction value to correct a rotational delay of the driven gear relative to the main drive gear caused by the backlash at the time of a reverse rotation, is provided. As the storage means, for example, there are an active component such as a semiconductor memory device such as a ROM (Read Only Memory), a RAM (Random Access Memory), and so on as well as a passive component such as a variable resistor, and a hybrid component in which the active component and the passive component are combined The calculation means can be constituted by, for example, a CPU (Central Processing Unit), a MPU (Micro Processing Unit), and so on. The calculation means is constituted such that the rotation angle of the steering shaft can be calculated by correcting the measured result of the measuring mechanism based on the correction value stored in the storage means.

According to the rudder angle sensor of the first aspect, the main drive gear reversibly rotates while being interlocked with the rotation of the steering shaft being the object of detection. The rotation of the main drive gear is transmitted to the driven gear engaging with the main drive gear. The rotation of the driven gear is an object of measurement of the measuring mechanism. The measured result of the measuring mechanism is transferred to the calculation means, and becomes an object of calculation together with the later-described correction value. Meantime, when the steering shaft is reversed from a rotation in one direction to the rotation in the other direction, a rotational delay by the reverse rotation of the driven gear relative to the main drive gear arises by means of the backlash existing between the main drive gear and the driven gear. The rotational delay of the driven gear is corrected by the correction value read from the storage device by the calculation means at the time when the calculation means performs the calculation. As a result, the rotation angle outputted by the rudder angle sensor and an actual rotation angle of the steering shaft coincide completely or approximately. Thereby, the rotation angle detection of the steering shaft with high accuracy is realized. Any special mechanical mechanism to prevent the backlash is not provided with relation to the main drive gear and the driven gear, and therefore, it is not lead to large-size compared to the conventional rudder angle sensor. Incidentally, the correction value may be a value obtained by a calculation based on structures of the main drive gear, the driven gear, and so on, but it is preferable to be a value based on the backlash actually measured when both gears are rotated. Because the gears are also machine parts, and therefore, dispersions of size and dimension may exist even though the dispersions are within a range of tolerance. The actual measurement is more suitable to correspond to such dispersions. In addition, for example, the actual measuring is further easier than a complicated calculation because when the measuring mechanism also includes the gears, the calculation to obtain the backlash of the included gears becomes very complicated. Besides, it cannot be denied that the gears and a peripheral mechanism thereof vary across the ages caused by an abrasion. Therefore, it can be constituted such that, for example, the backlash is actually measured again by a certain period of time, and the stored correction value is updated based on the actual measured value.

Second Aspects of Invention

In a rudder angle sensor according to a second aspect of the invention (hereinafter, referred to as "rudder angle sensor of second aspect), it is constituted such that the measuring mechanism at least includes a measurement small-diameter gear integrally rotating with the driven gear, and a measurement driven gear driven by engaging with the measurement small-diameter gear, and the correction value to be stored in the storage means is set, the correction value including a measurement correction value to correct a rotational delay of the measurement driven gear relative to the measurement small-diameter gear caused by the backlash at the time of the reverse rotation.

According to the rudder angle sensor of second aspect, the backlash existing between the measurement small-diameter gear and the measurement driven gear held by the measuring mechanism is also an object of correction. Namely, when the measuring mechanism in itself includes paired gears, it is possible to prevent a deterioration of accuracy caused by using the gears and to maintain a high accuracy of the rudder angle sensor by compensating the rotational delay for such the backlash existing between the gears.

Third Aspects of Invention

In the rudder angle sensor according to a third aspect of the invention (hereinafter, referred to as "rudder angle sensor of third aspect), it is constituted such that an interface capable of bringing in external data is provided at the calculation means, and rotation angle data of a measurement shaft obtained from an encoder provided at the measurement shaft can be brought in to the calculation means from the interface when the main drive gear is interlocked with the measurement shaft instead of the steering shaft, and it is constituted such that the calculation means can calculate the correction value based on the rotation angle data brought in and a measured result of the measuring mechanism.

According to the rudder angle sensor of the third aspect, at least the correction value, namely, the correction value to correct the rotational delay of the driven gear relative to the main drive gear caused by the backlash at the time of the reverse rotation can be actually measured. It is possible to obtain the correction value corresponding to the backlash of a gear mechanism when the measuring mechanism includes the gear mechanism (for example, the measurement driven gear driven by engaging with the measurement small-diameter gear included by the rudder angle sensor of the second aspect) in addition to the rotational delay of the driven gear relative to the main drive gear, and corresponding to factors when other factors causing the rotational delay exist. It is theoretically possible to obtain the correction value by calculation, but the correction value can be obtained more quickly and accurately by using the actually measured correction value than the theoretical correction value. Further, it becomes possible to make the rudder angle detection by the rudder angle sensor more accurately if it is constituted such that the correction value can be updated based on a remeasurement, for example, at the time of a safety inspection of an automobile, because the above-stated gear mechanism may have a deterioration over time such as an abrasion by an usage although it may be different depending on an environment or a frequency of usage.

DETAILED DESCRIPTION OF THE PREFERRED EMBODIMENT(S)

Hereinafter, a best mode for carrying out the present invention (hereinafter, referred to as "present embodiment") is described with reference to the respective drawings.

Installation Position of Rudder Angle Sensor

Figure 1:
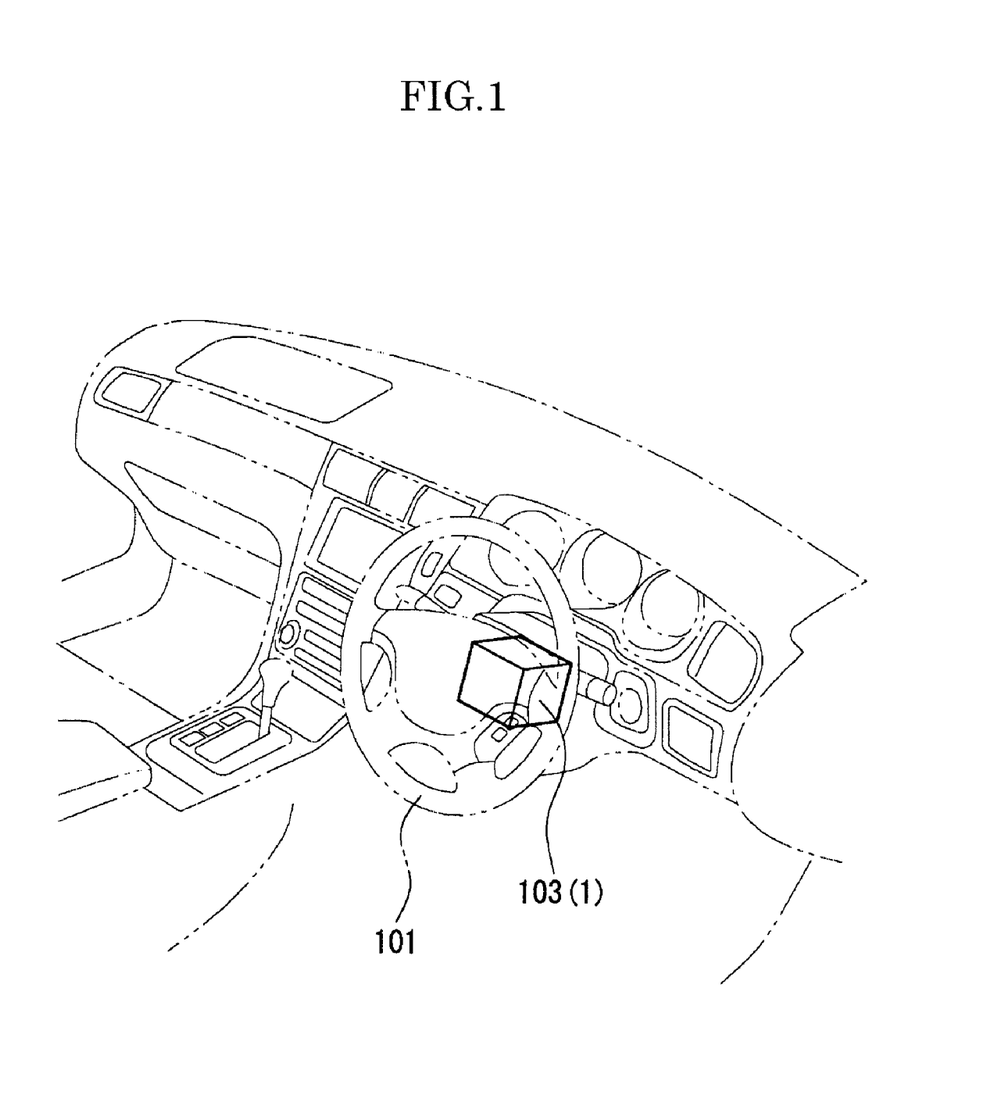
FIG. 1 is a perspective view showing an outline of an attachment position of a rudder angle sensor.
Figure 2:
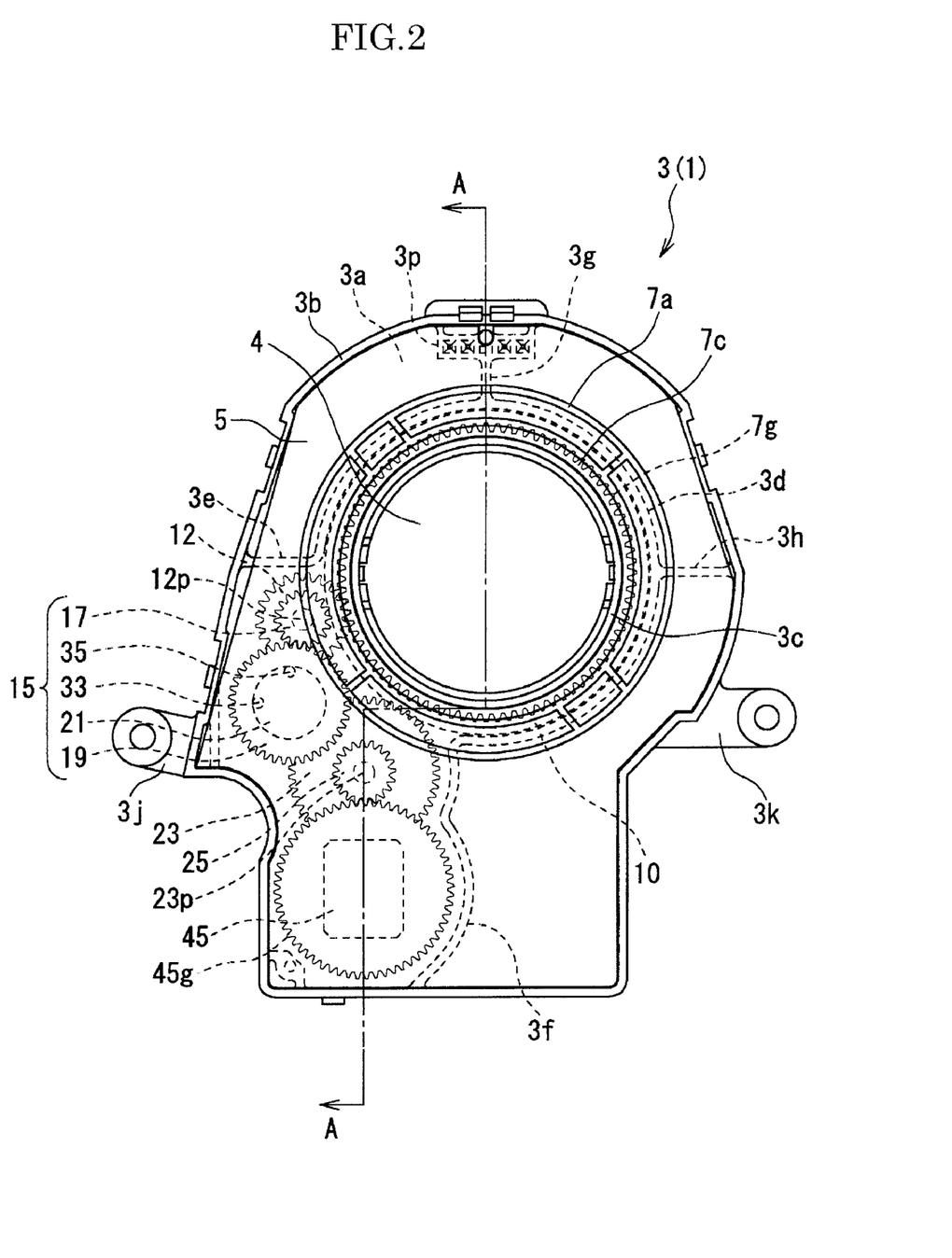
FIG. 2 is a plan view of the rudder angle sensor.
Figure 3:
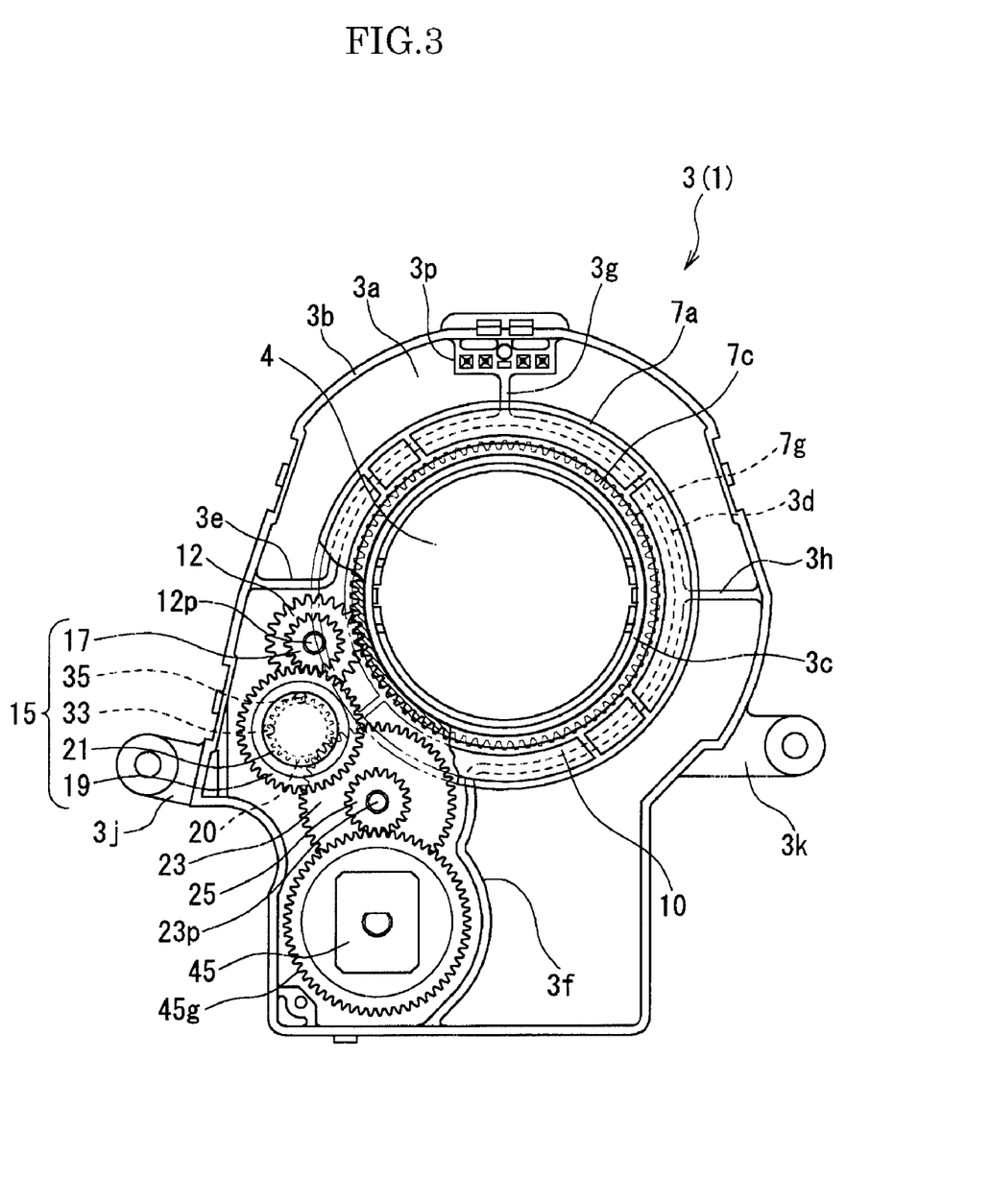
FIG. 3 is a plan view of the rudder angle sensor shown in FIG. 2 in a state that a supporting substrate thereof is detached.

An example of the installation position of the rudder angle sensor is described with reference to FIG. 1. It is general that a rudder angle sensor 1 is housed in a steering column 103 equipped with a handle 101 of a vehicle as shown in FIG. 1. A steering shaft 105 integrally rotating with the handle 101 is fixed to the handle 101 (refer to FIG. 4). The rudder angle sensor 1 is a sensor to detect a rotation angle of the steering shaft 105. It is constituted such that a later-described rotation ring 7 integrally rotates with the steering shaft 105 although the rudder angle sensor 1 in itself does not rotate.

Structure of Rudder Angle Sensor

A structure of the rudder angle sensor is described with reference to FIG. 2 to FIG. 5. The rudder angle sensor 1 includes a casing 3 made of synthetic resin, and a main external appearance of the rudder angle sensor 1 is constituted by the casing 3. The casing 3 is basically composed of a bottom portion 3a and a peripheral wall portion 3b standing from a peripheral edge of the bottom portion 3a. The casing 3 can be formed into various shapes in accordance with, for example, a difference of an internal structure such as a size and the number of gears to be housed, a difference of an external structure such as an attaching environment where the rudder angle sensor 1 is to be attached, and so on, and includes a shaft hole 4 in a thickness direction through which the steering shaft 105 extends. The shaft hole 4 is circular in shape, and an annular inside rib 3c standing in parallel with the peripheral wall portion 3b from the bottom portion 3a, and a similarly annular outside rib 3d standing at outside of the inside rib 3c, are formed at a peripheral edge of the shaft hole. The outside rib 3d is formed in a shape cutting out a part thereof, one end of the outside rib 3d opened by the cut-out is connected to the peripheral wall portion 3b by a connection rib 3e, and the other end of the opened outside rib 3d is connected to the peripheral wall portion 3b by a connection rib 3f respectively. Further, connection ribs 3g, 3h connecting the outside rib 3d and the peripheral wall portion 3b are formed between the connection rib 3e and the connection rib 3f. Each of the connection ribs 3e, 3f, 3g, and 3h are formed as the same height as the outside rib 3d. The connection ribs 3e, 3f, 3g, and 3h in cooperation with the outside rib 3d and so on play a role to reinforce the casing 3 and to support from downward a supporting substrate 5 located thereon, and play a role to form a space (the space surrounded by the connection rib 3e, the connection rib 3f, and the peripheral wall portion 3b) capable of housing a later-described driven gear 12 and so on between the bottom portion 3a of the casing 3 and the supporting substrate 5, and so on. Incidentally, reference numerals 3j, 3k show attachment protrusion protruded from the casing 3 to lateral direction (vertical direction relative to the peripheral wall portion 3b) so that the rudder angle sensor 1 can be attached at a predetermined portion. Reference numeral 3p shows a housing body formed by integrally molding with the casing 3 to house connection pins (not shown) to make an electrical connection between electronic components (not shown) and so on mounted on the supporting substrate 5 and external.

Figure 4:
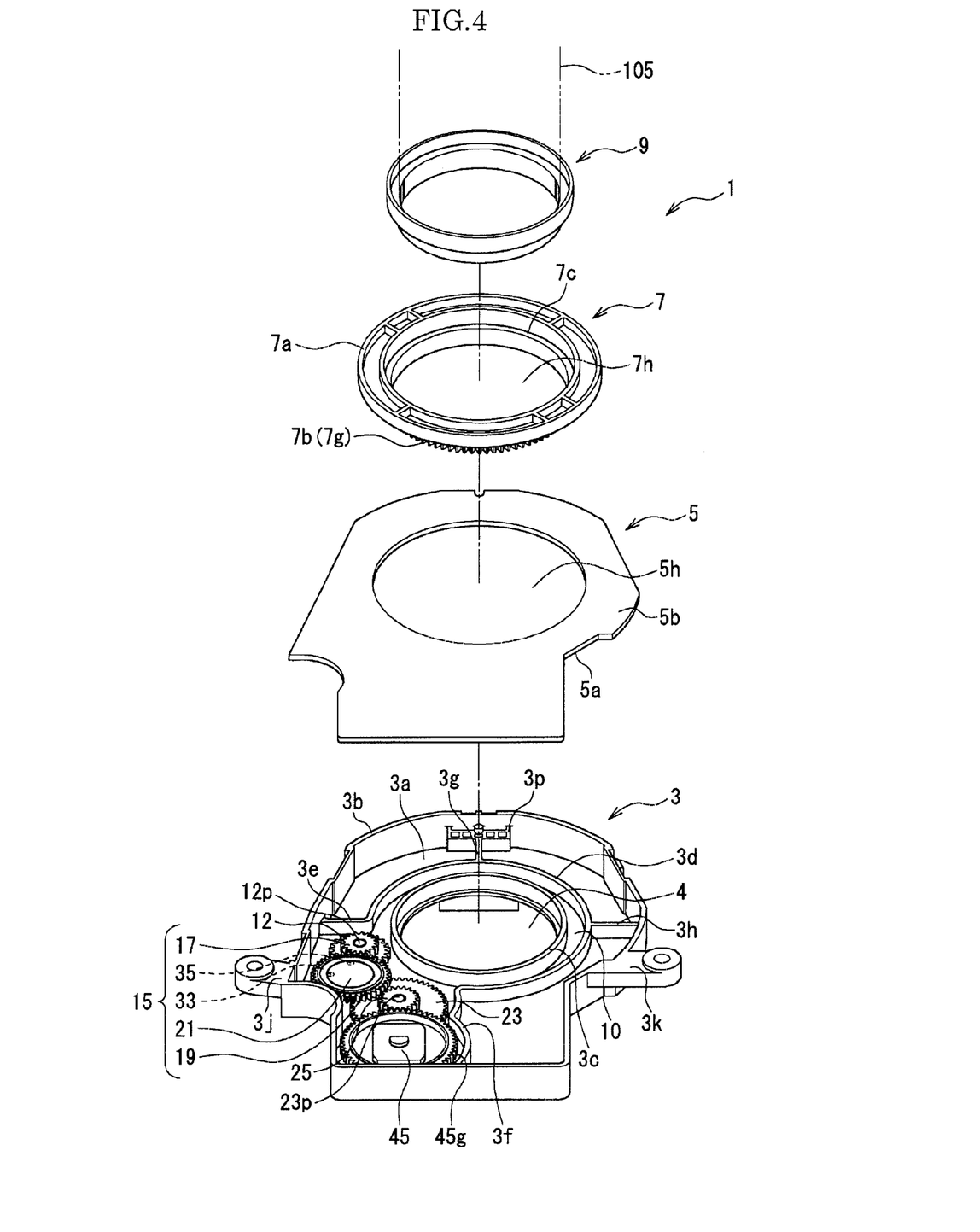
FIG. 4 is an exploded perspective view of the rudder angle sensor.
Figure 5:
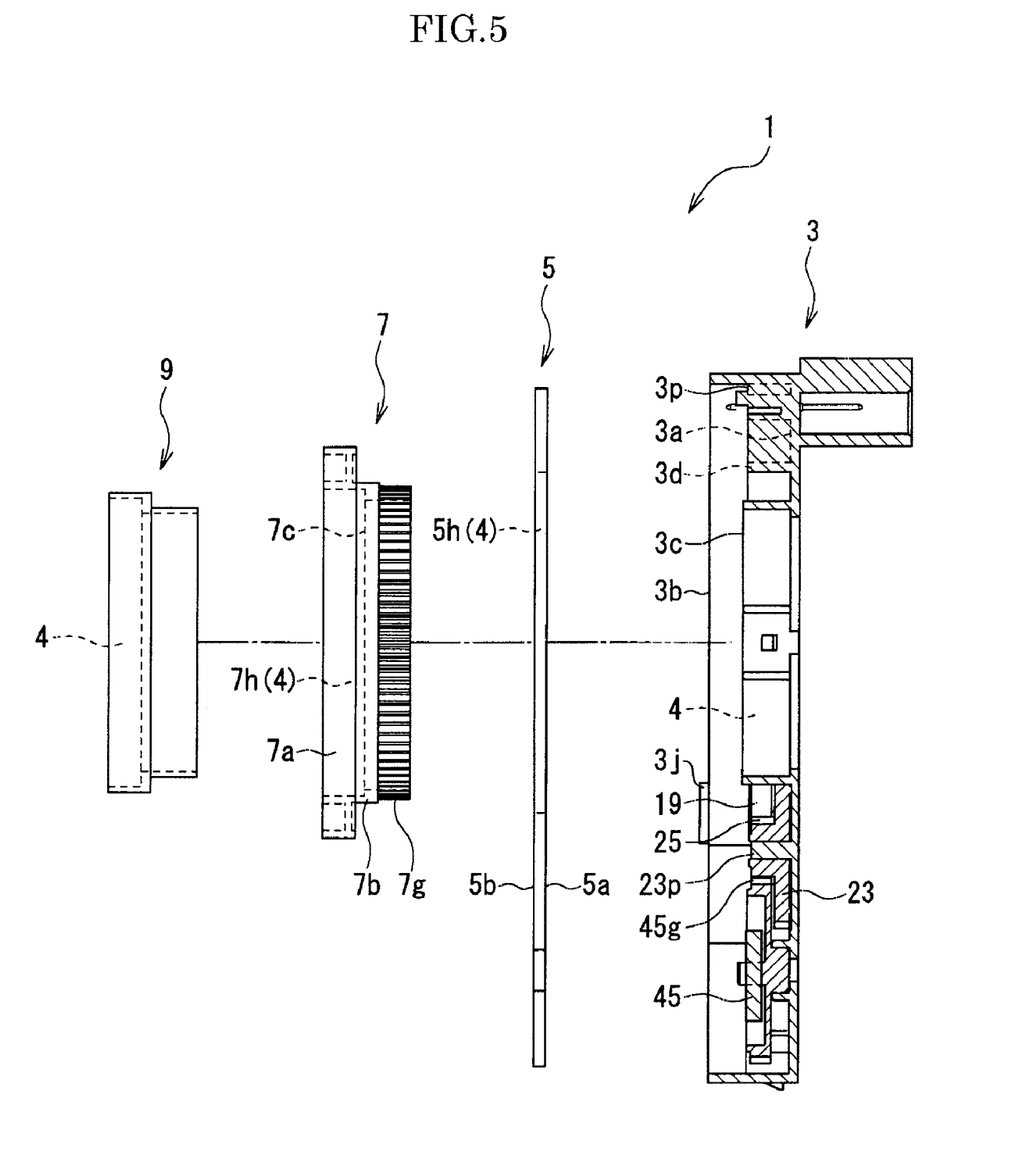
FIG. 5 is a sectional view taken along the line A-A of the rudder angle sensor shown in FIG. 2.
Figure 6:
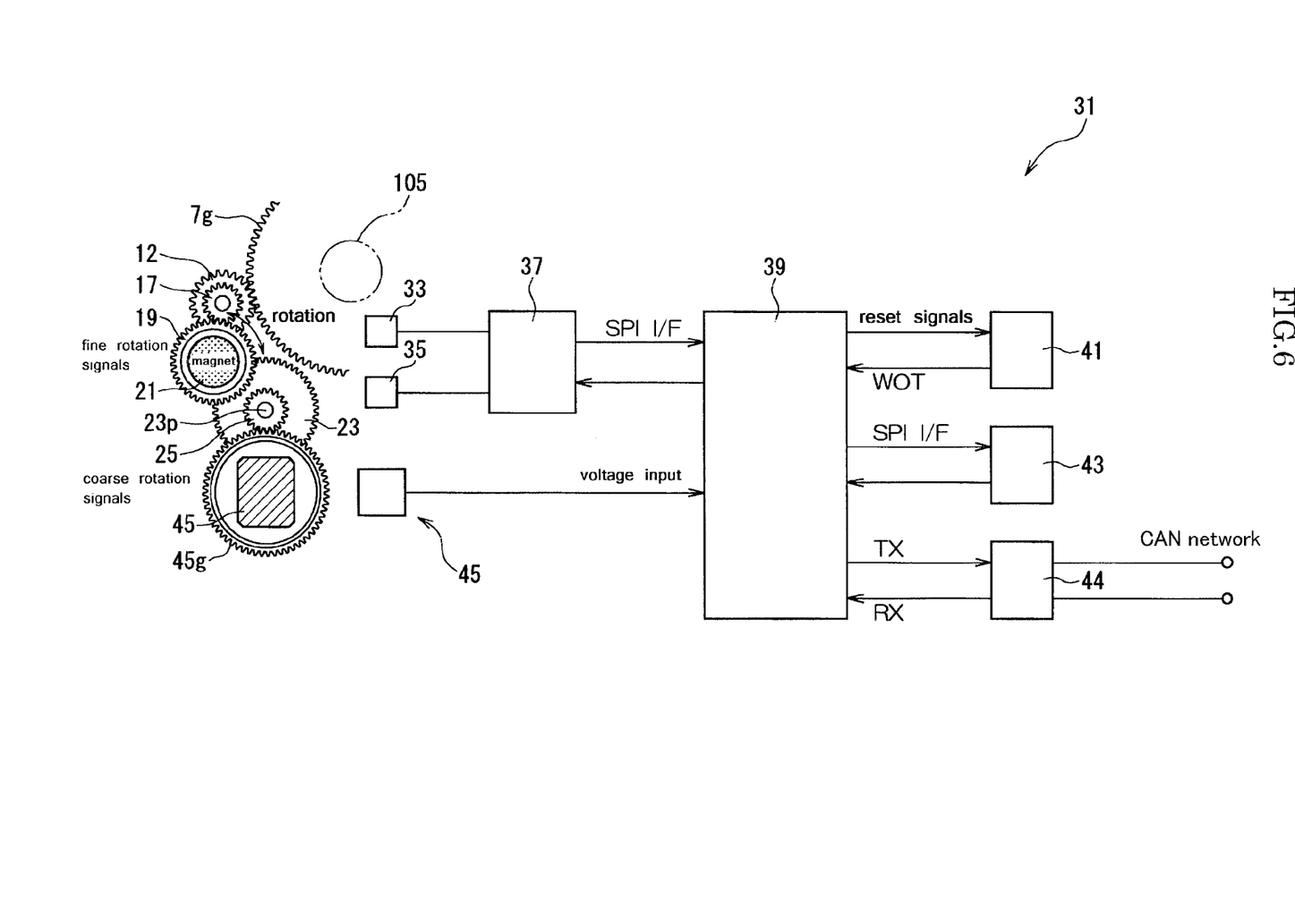
FIG. 6 is a block diagram showing an electrical configuration of the rudder angle sensor.
Figure 7:
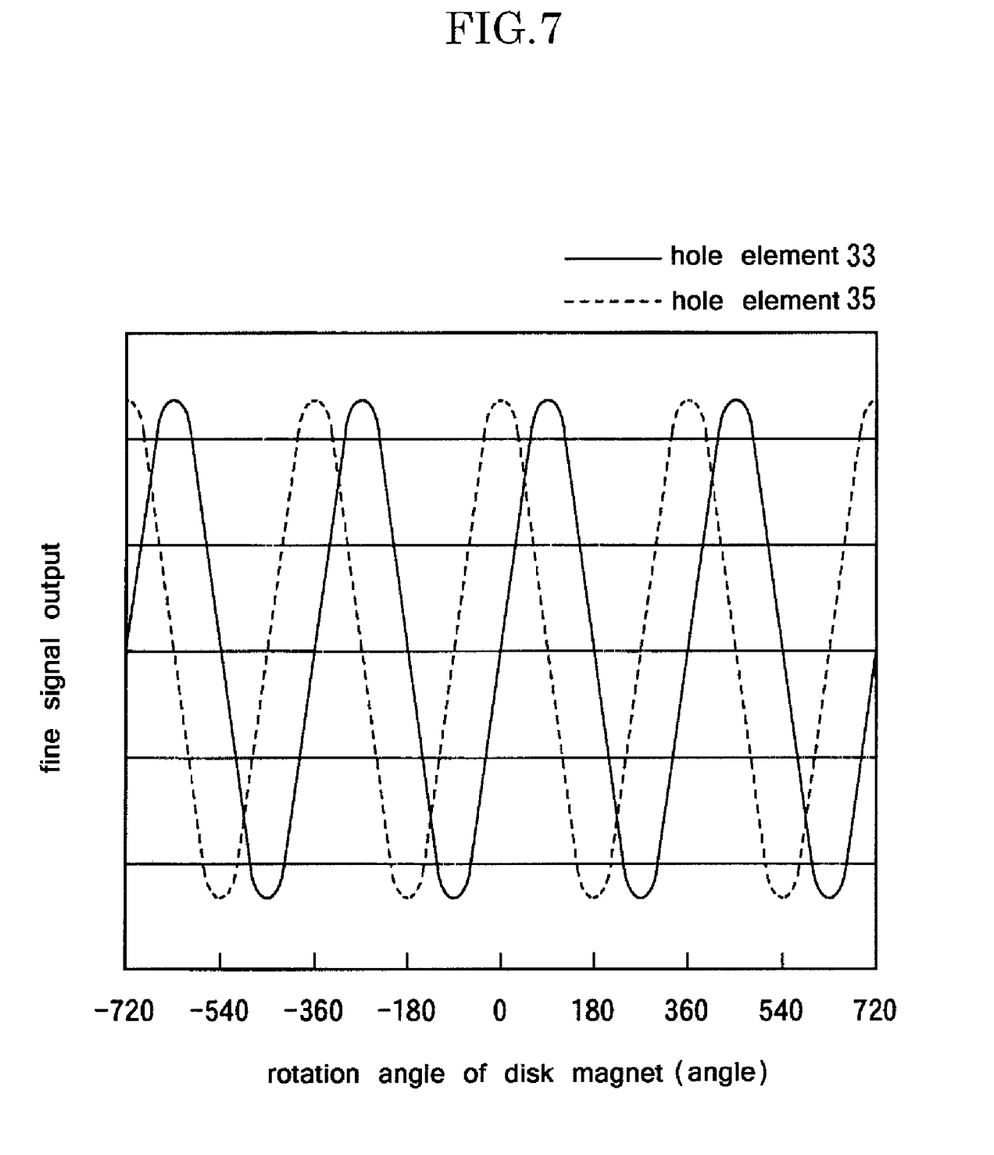
FIG. 7 is a graph showing fine signals.

The supporting substrate 5 is formed in a shape (size) approximately occupying inside of the casing 3 to effectively use inside of the casing 3. Therefore, the supporting substrate 5 is formed in an approximately similar shape to and slightly smaller than the casing 3. At the supporting substrate 5, a circular support hole 5h concentric with the shaft hole 4 when the supporting substrate 5 is housed in the casing 3 is formed to penetrate. The support hole 5h is formed to have a larger diameter than the shaft hole 4 and a peripheral edge thereof is to be mountable on the outside rib 3d and the connection ribs 3e, 3f of the casing 3 so as to be supported from downward. When the supporting substrate 5 is mounted on the outside rib 3d and so on, an annular space 10 visible when it is seen from above exists between the peripheral edge of the support hole 5h of the supporting substrate 5 and the inside rib 3c of the casing 3 (between the inside rib 3c and the outside rib 3d) (refer to FIG. 3). As shown in FIG. 4 and FIG. 5 the supporting substrate 5 includes a facing surface 5a facing the bottom portion 3a of the casing 3 (a surface being on the observer's right side in FIG. 5) and an attachment surface 5b to be an opposite side surface of the facing surface 5a. Various electronic components including components shown in FIG. 6 are properly mounted on the supporting substrate 5, except a region peripheral to the support hole 5h included by the attachment surface 5b.

The rotation ring 7 is described based on FIG. 2 to FIG. 5. The rotation ring 7 is an annular member having a hollow portion 7h formed by integrally molding synthetic resin, and it is basically composed of an annular flange portion 7a and an annular wall portion 7b standing from one of surfaces of the annular flange portion 7a. An outside diameter of the annular wall portion 7b is smaller than the outside diameter of the annular flange portion 7a, because the annular wall portion 7b is formed in concentric state with the annular flange portion 7a, and it is standing from the annular flange portion 7a. A step portion 7c protruding toward the hollow portion 7h side is formed in the rotation ring 7 (refer to FIG. 4). A main role of the step portion 7c is to prevent a next described fixing ring 9 from slipping out, when it is inserted into the rotation ring 7. The fixing ring 9 is a fixing member to make the steering shaft 105 and the rotation ring 7 interlock to rotate reversibly, and it is constituted to be interposable between both of them and to be attachable to and detachable from both of them. A gear portion 7g to make the rotation ring 7 function as the main drive gear is formed at an outer peripheral surface of a tip end portion seen from the annular flange portion 7a of the annular wall portion 7b. The annular wall portion 7b and the main drive gear 7g are constituted to be insertable into the annular space 10 existing between the peripheral edge of the support hole 5h of the supporting substrate 5 and the inside rib 3c of the casing 3. It goes without saying that the annular wall portion 7b and the main drive gear 7g inserted into the annular space 10 are similarly rotatable in a circumferential direction relative to the peripheral edge of the support hole 5h (outside rib 3d) and the inside rib 3c.

Structures of Driven Gear and Measuring Mechanism

The driven gear and a measuring mechanism are described with reference to FIG. 3 to FIG. 7. A driven gear 12 is provided rotatably centering on a support pin 12p standing from the bottom portion 3a of the casing 3 (refer to FIG. 3), and engageably with the main drive gear 7g. A speed increasing ratio of the main drive gear 7g and the driven gear 12 in the present embodiment is almost set in the vicinity of 1:3.

A measuring mechanism 15 is basically composed of a measurement small-diameter gear 17, a measurement driven gear 19 driven by engaging with the measurement small-diameter gear 17, a disk magnet 21 coaxially and integrally rotating with the measurement driven gear 19 (refer to FIG. 3, FIG. 6), and a detecting circuit 31 including hole elements 33, 35 detecting a magnetic field of the disk magnet 21. The hole element 33 and the hole element 35 are disposed on a circumference of which centers are common with a center of the disk magnet 21 (measurement driven gear 19), at positions shifted approximately 90 degrees. The measurement small-diameter gear 17 is provided coaxially and integrally with the driven gear 12, and is constituted to be integrally rotatable with the driven gear 12 centering on the support pin 12p. A signal obtained from the measuring mechanism 15 is a signal showing an angle of the steering shaft 105 within a range of 0 (zero) degree to 360 degrees, and it is generally also called as a fine signal. Incidentally, a fine signal detection is possible by a detection method other than the method according to the above-stated mechanism, and for example, there are methods using an MR element, and a variable resistor as such detection method.

Figure 8:
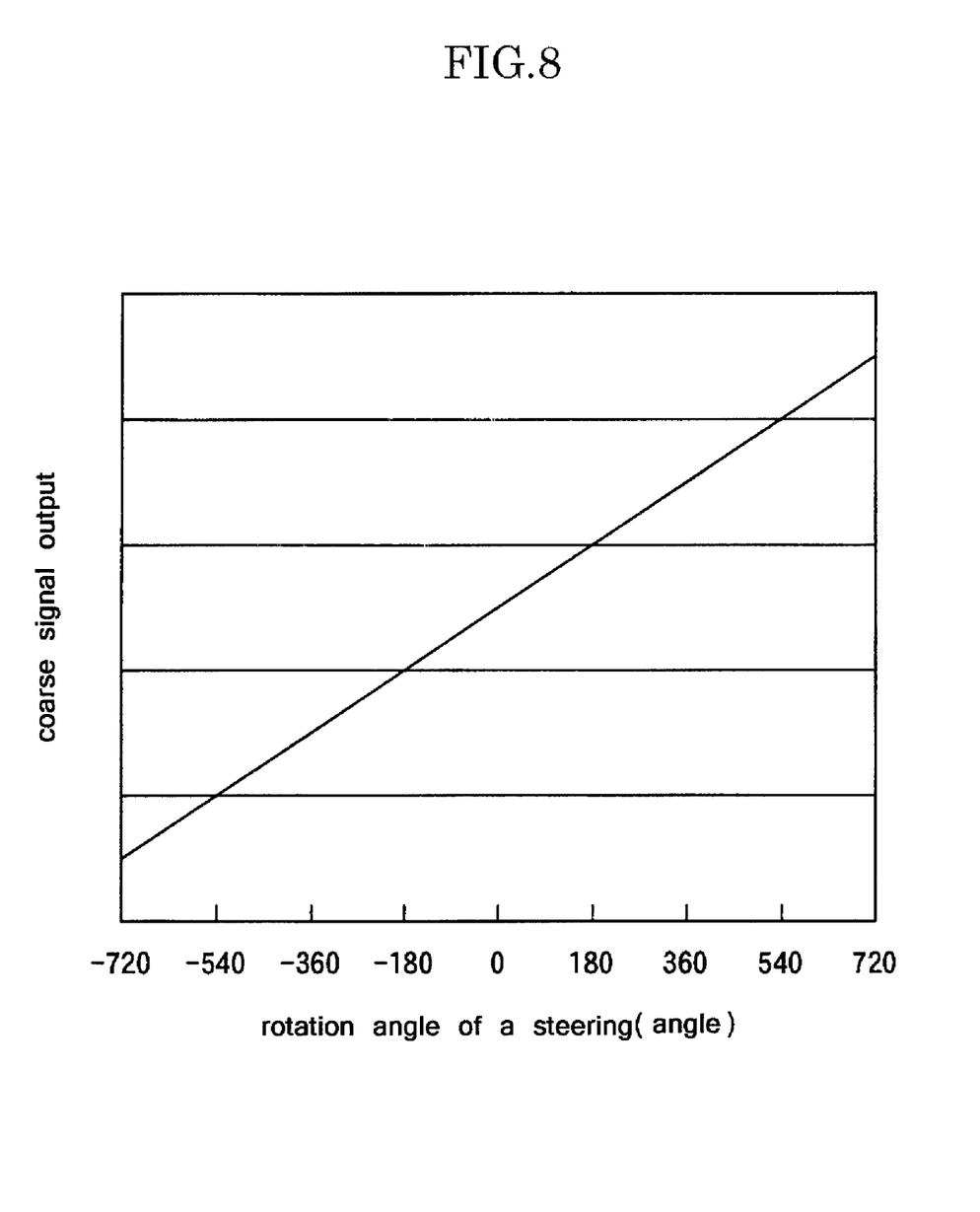
FIG. 8 is a graph showing coarse signals.
Figure 9:
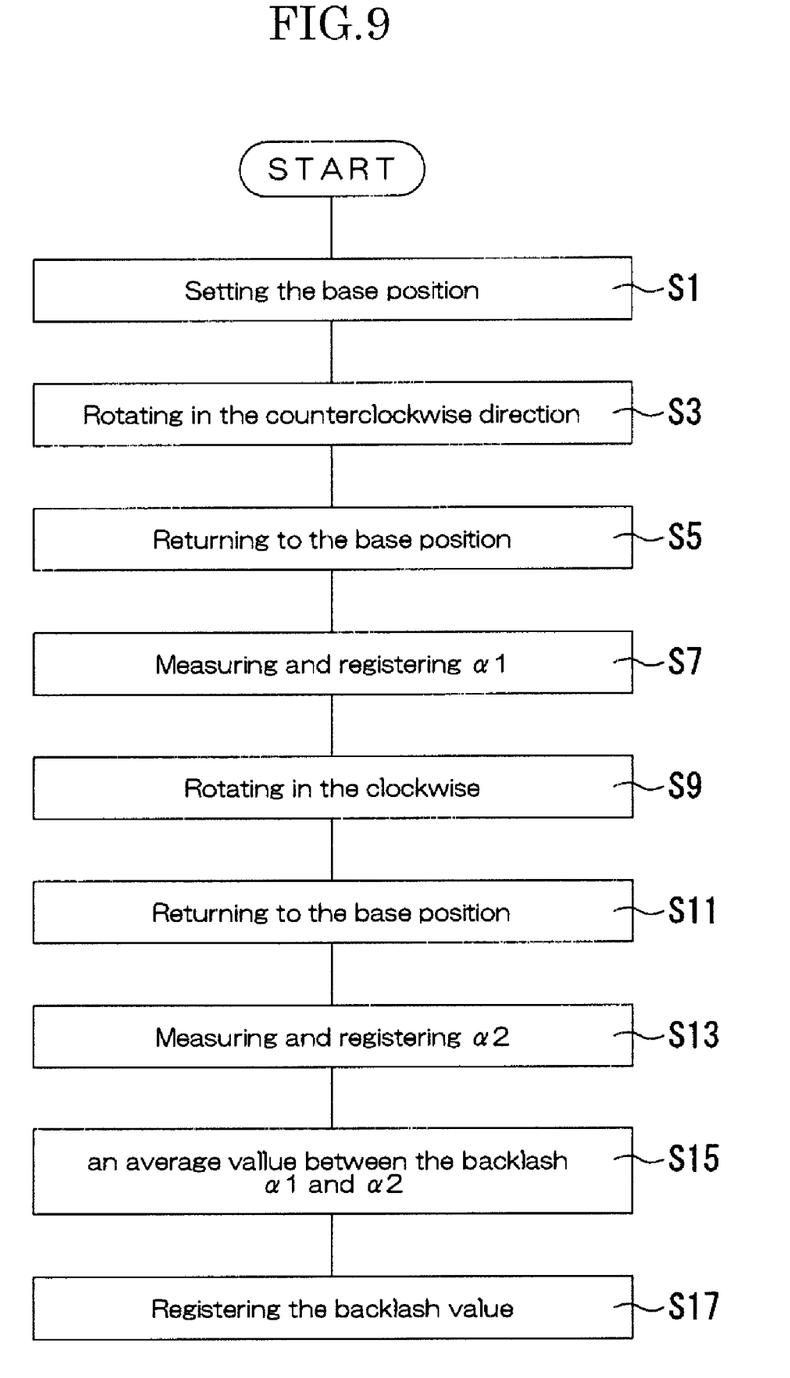
FIG. 9 is a flow chart showing a correction procedure.

As shown in FIG. 6, the detection circuit 31 is constituted by including an angle conversion circuit 37, an MPU 39, a reset IC 41, an E$^2$PROM 43, a CAN transceiver 44, and a multiple rotation detection mechanism 45, in addition to the above-stated hole element 33 and hole element 35. The angle conversion circuit 37 is a circuit to convert detection signals having different phases obtained from the hole elements 33, 35 into an angle (refer to FIG. 7). The MPU 39 is a control device taking charge of a function as a later-described calculation means in addition to a control of all over the rudder angle sensor 1. The reset IC 41 is an IC to perform a runaway prevention of the MPU 39. The E$^2$PROM 43 is a device to store a later-described correction value as a storage means. The CAN transceiver 44 takes charge of a communication function to output a signal showing the rotation angle of the steering shaft 105 to external. The multiple rotation detection mechanism 45 is a detecting member, a detecting mechanism, or the like to detect in which direction (clockwise direction, counterclockwise direction) and how many times the steering shaft 105 rotates (refer to FIG. 4). There is no limitation in a member or a mechanism to be adopted as long as the detection as stated above is possible, but in the present embodiment, a potentiometer is adopted because it is relatively low cost and a stable operation can be expected. The potentiometer outputs a signal which is approximately in proportion to the rotation angle thereof by rotating the potentiometer. The signal outputted by the multiple rotation detection mechanism 45 is generally also called as a coarse signal. The output signal of the multiple rotation detection mechanism 45 in the present embodiment shows an approximately linear characteristic as shown in FIG. 8. Namely, the steering shaft 105 in the present embodiment is constituted to rotate four times as described later, and it is constituted such that the multiple rotation detection mechanism 45 rotates once while the above-stated four rotations. The rotation of the multiple rotation detection mechanism 45 is not necessary to be limited to once, and it can be constituted to rotate plural times depending on the situation. The multiple rotation detection mechanism 45 includes a gear portion 45g at a periphery thereof, and it is rotated by a mechanism stated next. Namely, at first, the rotation of the measurement driven gear 19 is as already explained, and in addition, a transmission small-diameter gear 20, coaxially and integrally rotating with the measurement driven gear 19, is provided at the measurement driven gear 19. The transmission small-diameter gear 20 positions at a rear side of the measurement driven gear 19 shown in FIG. 3, and therefore, it is shown in a dotted line in the same drawing. The transmission small-diameter gear 20 is constituted to engage with an intermediate large-diameter gear 23 rotatably supported by a support pin 23p as a driving wheel to thereby rotate the intermediate large-diameter gear 23. The intermediate large-diameter gear 23 rotates as a driven wheel of the transmission small-diameter gear 20 integrally rotates an intermediate small-diameter gear 25 which is coaxial and integrated with the intermediate large-diameter gear 23. The intermediate small-diameter gear 25 then rotates the gear portion 45g engaging with this, namely, the multiple rotation detection mechanism 45. It is possible to detect the rotation angle of the steering shaft 105 by combining the coarse signal outputted by the above-stated constitution and the stated above fine signal showing the angle in the range of 0 (zero) degree to 360 degrees (hereinafter, a rotation relating to the fine signal is called as a "fine rotation").

A relation between the coarse signal and the fine signal is described with citing concrete examples. Here, the steering shaft 105 is assumed to be rotatable 720 degrees each in the clockwise direction and counterclockwise direction (−720 degrees to +720 degrees). The steering shaft 105 rotates 4.0 rotations (720 degrees×2÷360 degrees) from an end of clockwise rotation to an end of counterclockwise rotation. Further, the rotation angle within one rotation among the above-stated four rotations (rotation angle of the fine rotation) is assumed to be, for example, 15 degrees in the clockwise direction (+15 degrees). It can be seen that the steering shaft 105 is in a state rotating +15 degrees by using the fine signal, but it cannot be seen to which rotation this fine rotation of +15 degrees is belonging among the above-stated four rotations. It cannot be distinguished whether it is the fine rotation of +15 degrees within 360 degrees of the first rotation, or the fine rotation of +15 degrees within 360 degrees of the second rotation. Therefore, it is constituted such that it can be judged accurately in which rotation among the four rotations the fine rotation is included and what degrees it is by combining the coarse signal and the fine signal.

Correction of Rotation Angle

As stated above, it is possible to detect the rotation angle of the steering shaft 105 by using both the fine signal and the coarse signal, but in the present embodiment, a correction to compensate for a rotational delay (rotational discrepancy) caused by a backlash of gears is added to the fine signal (measured result) obtained via the measuring mechanism 15 to further improve the detection accuracy. The backlash may cause the rotational delay of the driven side gear when the main drive side gear is reversed. It is already described in the section of "Description of the related art" described above, as for the rotational delay of the driven side gear. When the correction is added, at first, a correction for a backlash (backlash B1) existing between the main drive gear 7g and the driven gear 12, is performed, and in addition, a correction for a backlash (backlash B2) existing between the measurement small-diameter gear 17 and the measurement driven gear 19, is performed because the gears are used in the measuring mechanism 15 in the present embodiment. It goes without saying that it is not necessary to consider the backlash B2 if the measuring mechanism 15 does not use the gears. Both the backlash B1 and the backlash B2 can be grasped from a design stage, and therefore, it is possible to calculate a value to be compensated, namely, a correction value, accordingly.

However, in the present embodiment, the correction value is determined based on an actual measurement because variations, abrasions, or the like of components may exist.

Actual Measurement and Registration Procedure of Correction Value

The actual measurement and a registration procedure of the correction value to compensate the backlash B1 and the backlash B2 are described with reference to FIG. 10A, FIG. 10B, and FIG. 11. A block diagram shown in FIG. 11 is not basically different from the block diagram shown in FIG. 6. A different point is that a measurement shaft 105' and an interface 39a of the MPU 39 which are not necessarily required in the block diagram shown in FIG. 6 are shown in FIG. 11.

At first, the actual measurement is started from attaching the measurement shaft 105' instead of the steering shaft 105 to the rudder angle sensor 1 (the rotation ring 7, namely, the main drive gear) (refer to FIG. 11). It is possible to make the actual measurement in a state that the rudder angle sensor 1 is attached to the steering shaft of the actual vehicle, but the actual measurement made by attaching the measurement shaft 105' to the rudder angle sensor 1 to be an object of the actual measurement is easier. It is inevitable that the attachment becomes complicated when the actual measurement is made while the rudder angle sensor 1 is attached to the actual vehicle because members other than the steering shaft get in the way. However, the actual measurement operation can be simplified because there are no members getting in the way when the actual measurement is performed by the measurement shaft. The point that a length of the measurement shaft 105 ' can be shorter than the steering shaft 105 is also one of advantages. An encoder 111 capable of measuring the rotation angle of the measurement shaft 105' is attached to the measurement shaft 105'. Rotation angle data of the measurement shaft 105' measured by the encoder 111 can be brought in to the MPU 39 via the interface 39a.

Hereinafter, the registration procedure of the backlash is described. In the following description, the backlash means a backlash (degree) of the rotation angle as long as it is not mentioned in particular. The attachment of the measurement shaft 105' is performed, an output terminal of the encoder 111 is connected to the interface 39a of the MPU 39, and then a setting of a reference position is performed. Here, a position in a vicinity of a midpoint between a counterclockwise direction rotation and a clockwise direction rotation of the measurement shaft 105' (shown by a black circle in FIG. 10A) is set as the reference position. After the reference position is determined, a measured angle $\theta e_0$ of the encoder 111 and a measured angle $\theta s_0$ of the measuring mechanism 15 at the reference position are provisionally registered into the MPU 39. It may be constituted such that readings of the respective rotation angles of the encoder 111 and the measuring mechanism 15 are reset to 0 (zero) degree when the above-stated reference position is set, and thereafter, they are provisionally registered. Hereinafter, the description is performed on the assumption that the readings of the encoder 111 and the measuring mechanism 15 are reset to 0 (zero) degree according to the above-stated procedure as a matter of convenience of description. After the provisional registration is made, the measurement shaft 105' is rotated in a left direction (counterclockwise direction) until it is fully turned. The fully turned state becomes to be a state, for example, as shown in FIG. 10B. The rotation angle of the measurement shaft 105' shown by the encoder 111 at the time when it is fully turned represents −720 degrees (−360 degrees×2). The angle at this time is inscribed as −720 degrees if necessary as a matter of convenience of description. On the other hand, a backlash represented by "α" in FIG. 10A (namely, the backlash B1) exists between the rotation ring 7 being the main drive gear and the driven gear 12, and therefore, a rotation angle $\theta s_L$ shown by the measuring mechanism 15 represents (−720+α) though a rotation angle $\theta e_L$ shown by the encoder 111 is −720 degrees. Namely, the measuring mechanism 15 shows the rotation angle smaller than the rotation angle shown by the encoder 111 for the extent of α degrees. The backlash α degrees is provisionally registered into the MPU 39. This backlash α degrees becomes a measurement error arising between the measurement shaft 105' and the measuring mechanism 15.

Figure 10:
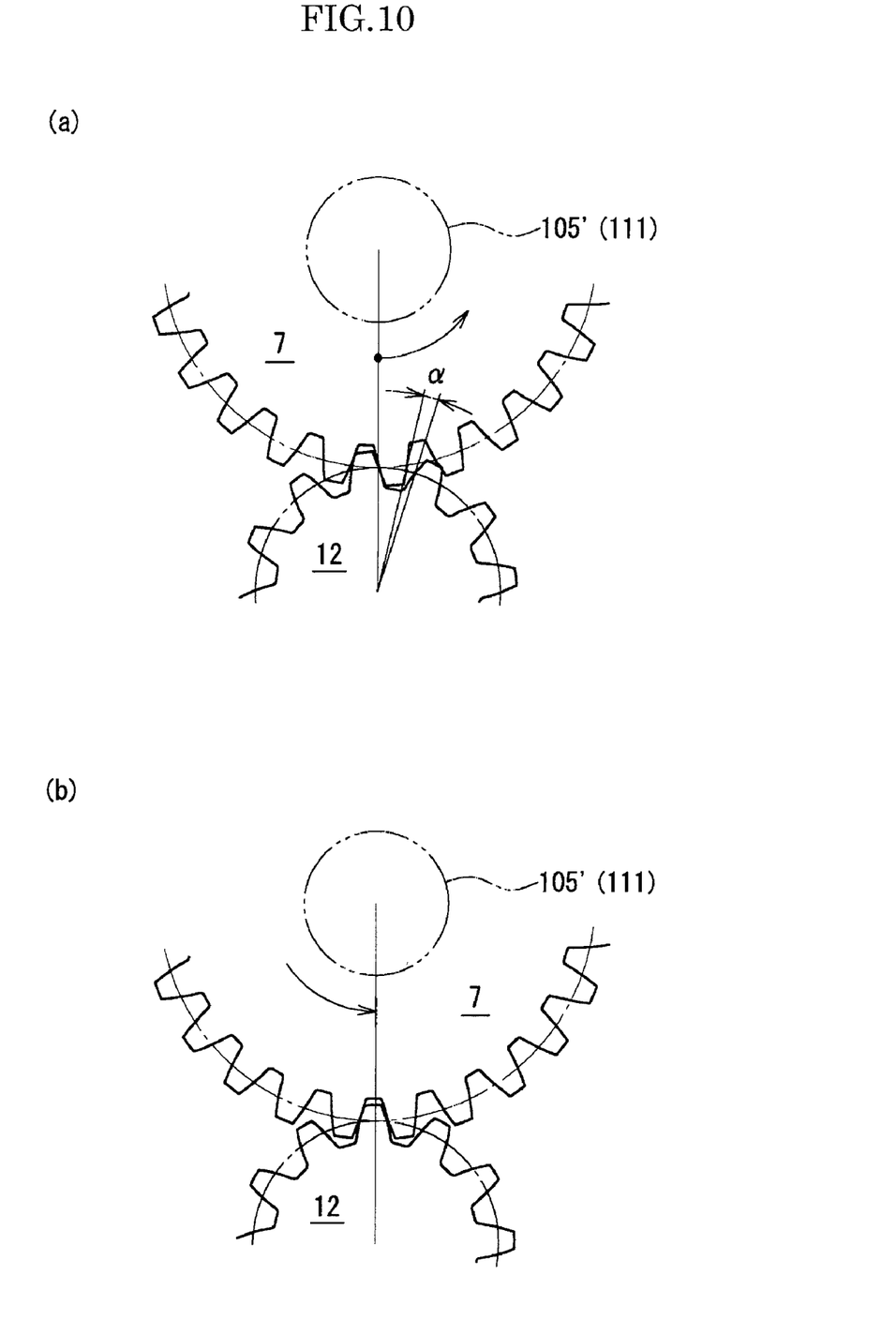
FIG. 10A and FIG. 10B are views explaining a backlash.
Figure 11:
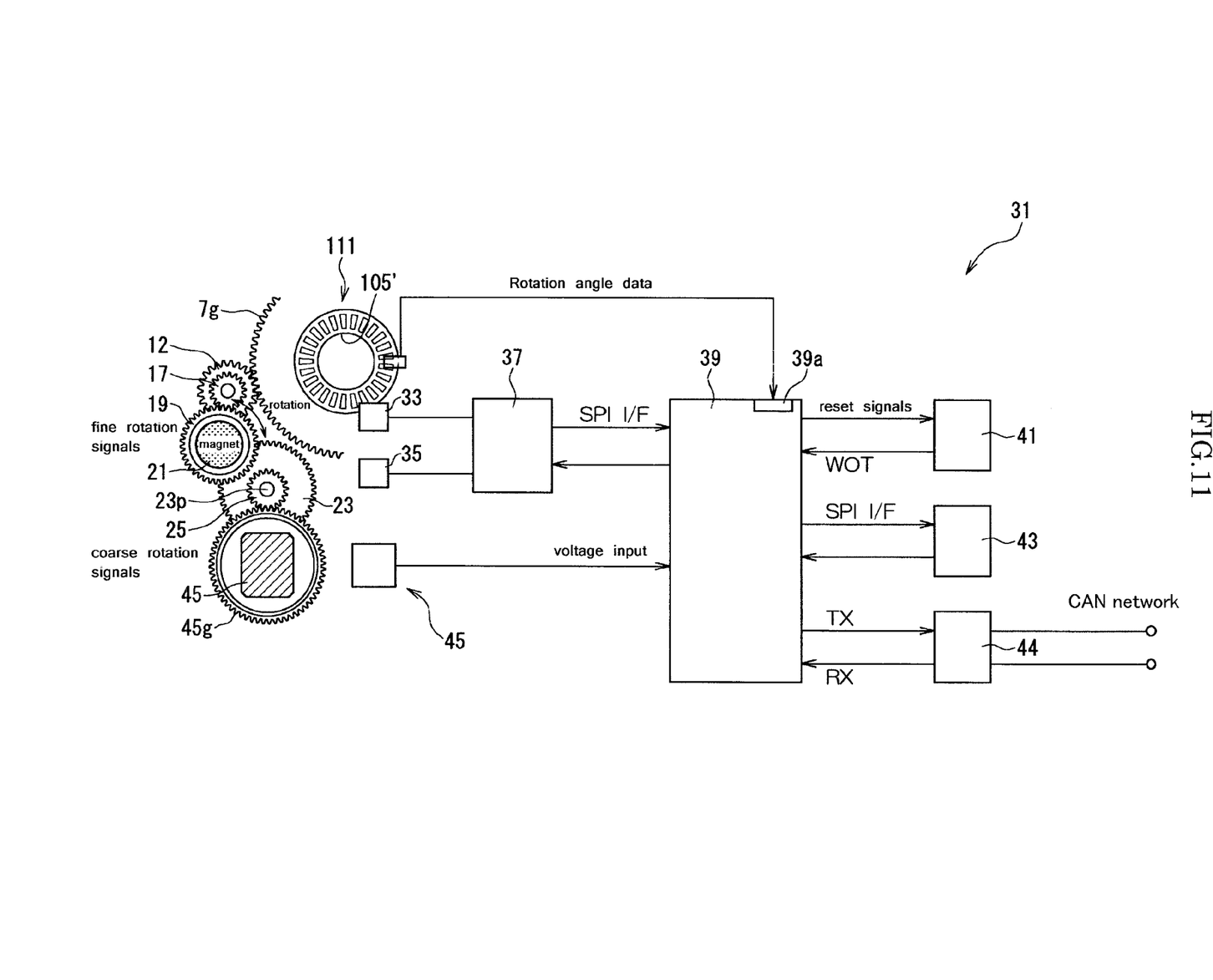
FIG. 11 is a view showing a modified example of the electrical configuration shown in FIG. 6.

Here, the α degrees corresponding to a play in a radial direction (circumferential direction) between gears in a state shown in FIG. 10A is explained as the backlash α degrees as it is, in the description of the registration procedure, but this is for convenience of description, and for example, the play in a thrust direction and so on may exist in actual. The above-stated thrust play and so on in that case also acts on the discrepancy of the rotation angle, and as a result, the thrust play and so on are included in the rotation angle $\theta s_L$ of the measuring mechanism 15. Namely, it is possible that elements other than the radial play are included in the rotation angle $\theta s_L$. Generally, a difference between the rotation angle $\theta s_L$ shown by the measuring mechanism 15 and the rotation angle $\theta e_L$ shown by the encoder 111 corresponds to the backlash α degrees. Incidentally, in the present embodiment, the measuring mechanism 15 in itself includes the gear mechanism, and therefore, the backlash in the gear mechanism may cause the measurement error. However, a causal relation between the backlash and the measurement error is as stated above, and therefore, the description of the backlash in the gear mechanism is not given. Incidentally, the following description is continued on the assumption that the measurement error by the gear mechanism does not exist, for the same intention.

The procedure in which the backlash is measured at the point where the measurement shaft 105' is fully turned in the counterclockwise direction from the midpoint and it is registered into the MPU 39, is described in the preceding two sections. Only the backlash value obtained by the measurement at the fully turned position in one direction is enough to obtain the correction value to correct the rotational delay, but a measuring method in which the measurement at the fully turned position in the clockwise direction is added to the measurement in the counterclockwise direction, namely, the measuring method measuring at the positions fully turned in both directions can also be adopted. The measuring method measuring at the positions fully turned in both directions is the same as the measuring method measuring at the position fully turned in one direction, in a point that the reference position is set in the vicinity of the midpoint, but it is the method in which the backlash values are obtained for the respective positions fully turned in the counterclockwise direction and clockwise direction, and they are averaged. The flow chart in FIG. 11 is additionally referred to for the description of the measurement at the positions fuly turned in both directions.

At first, the setting of the reference position is performed. The reference position can be set at an arbitrary position, but in the present embodiment, it is set at the midpoint between the counterclockwise direction rotation and the clockwise direction rotation. A measured angle θe of the encoder 111 (not shown) and a measured angle θs of the measuring mechanism 15 (not shown) at that time are respectively reset to 0 (zero) degree. The setting of the reference position is completed by this reset (S1). After the setting of the base position is completed, the measurement shaft 105' is rotated in the counterclockwise direction (left turn in FIG. 10A and FIG. 10B) until it is fully turned (S3). It is the same as the above-stated measuring method measuring at the position fully turned in one direction, up to here. The measurement shaft 105' fully turned in the counterclockwise direction is rotated in the clockwise direction (right turn in FIG. 10A and FIG.

10B) which is a reverse direction from the direction it was fully turned, to return to the position (in the vicinity of the midpoint) where the measured angle θe of the encoder 111 shows 0 (zero) degree, namely, to the reference position (S5). A measured angle θs' shown by the measuring mechanism 15 when the measurement shaft 105' is at the position where the measured angle θe of the encoder 111 shows 0 (zero) degree, is a backlash α1 in the counterclockwise direction (not shown). The backlash α1 is provisionally registered into the MPU 39 (S7).

After the provisional registration is completed, the measurement shaft 105' is further rotated in the clockwise direction to be fully turned (S9), and then, it is reversed to return to the position (in the vicinity of the midpoint) where the measured angle θe of the encoder 111 shows 0 (zero) degree (S11). A measured angle θs" (not shown), shown by the measuring mechanism 15 when the returning is finished, is a backlash α2 in the clockwise direction (not shown). The backlash α2 is a backlash in the reverse direction from the backlash α1. The obtained backlash α2 is also provisionally registered into the MPU 39 (S13). Next, an average value between the backlash α1 and the above-stated backlash α2 provisionally registered to the MPU 39 is calculated (S15), and the calculated result is registered (stored) to the E$^2$PROM 43 as a final correction value (S17). This is the completion of the setting of the correction value. After that, the measurement shaft 105' is detached, and then, the rudder angle sensor 1 mountable on the actual vehicle is obtained. Incidentally, in the above-stated actual measuring procedure, the rotation in the counterclockwise direction is performed first, and then the rotation in the clockwise direction is performed later, but a reverse procedure to this can also be adopted.

To update a correction value of the rudder angle sensor which is actually used, the above-stated measurement shaft 105' is attached to the rudder angle sensor 1 detached from the steering shaft 105 of the actual vehicle to obtain the correction value according to the procedure described above, and the obtained correction value is overwritten to the prior and existing correction value.

Operations and Effects of Rudder Angle Sensor

Figure 12:
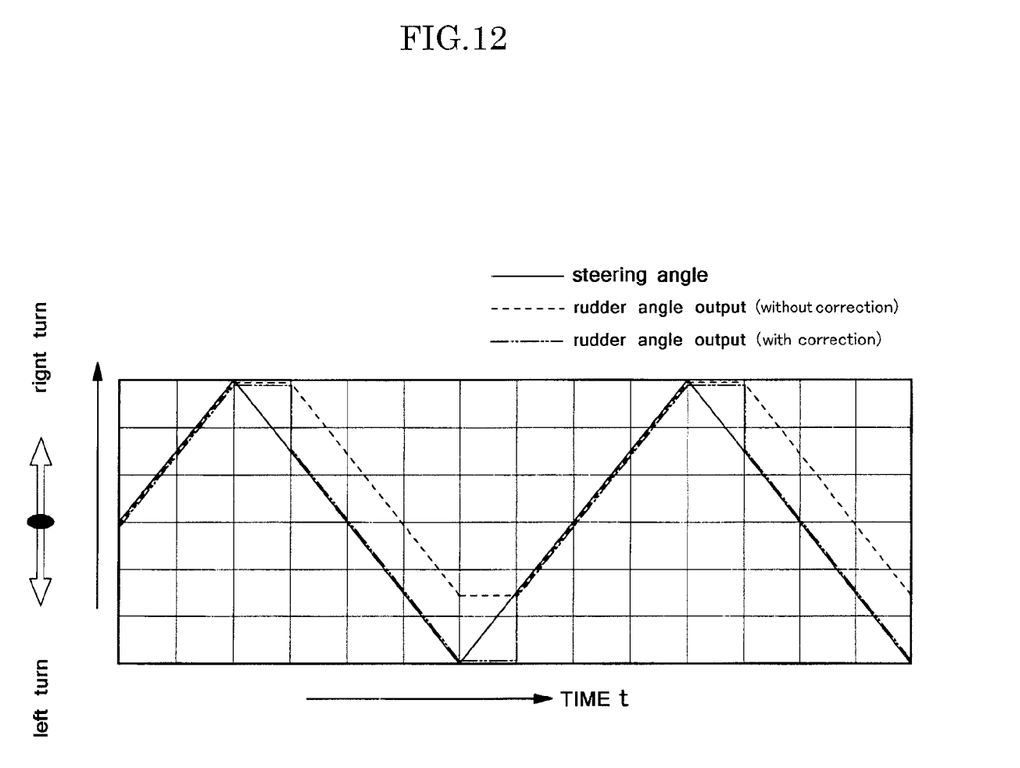
FIG. 12 is a graphic chart showing steering angles before and after a correction.

According to the rudder angle sensor 1 described hereinabove, the following operations and effects are obtained. The rudder angle sensor 1 mounted inside of the steering column 103 of the actual vehicle (refer to FIG. 1) is attached to the steering shaft 105 as shown in FIG. 4. The steering shaft 105 reversibly rotates integrally with the handle 101 shown in FIG. 1. Here, when the handle 101 is rotated in either direction, the steering shaft 105 rotates according to the rotation of the handle 101. The rotation of the steering shaft 105 reversibly rotates the rotation ring (main drive gear) 7 shown in FIG. 6. The rotation of the rotation ring 7 is transmitted to the driven gear 12 engaging with the rotation ring 7. The driven gear 12 is the object of measurement of the measuring mechanism 15. The measured result of the measuring mechanism 15 is transferred to the MPU 39 being the calculation means, and it becomes the object of calculation together with the correction value registered to the E$^2$PROM 43. Meantime, when the steering shaft 105 is reversed from the rotation in one direction to the rotation in the other direction, the rotational delay by the reverse rotation of the driven gear 12 relative to the rotation ring 7 arises by means of the backlash existing between the rotation ring 7 and the driven gear 12. The rotational delay of the driven gear 12 is corrected by the correction value read by the MPU 39 from the E$^2$PROM 43 being the storage device at the time of calculation by the MPU 39, and as a result, the rotation angle outputted by the rudder angle sensor 1 and the actual rotation angle of the steering shaft 105 coincide completely or approximately. The solid line shown in FIG. 12 represents the actual rotation angle of the steering shaft 105, and similarly, the dotted line shows the rotation angle outputted from the measuring mechanism 15, respectively. The difference between the solid line and the dotted line represents the rotational discrepancy between the rotation ring 7 (steering shaft 105) and the driven gear 12 occurred by the backlash. The discrepancy is corrected based on the correction value, to become the rotation angle shown by the two-dot chain line. By means of the correction, the rotation angle shown by the two-dot chain line coincide approximately with the rotation angle of the steering shaft 105 shown by the solid line. Herewith, the high-accurate rotation angle detection of the steering shaft 105 is realized.

According to a rudder angle sensor of the present invention, a measured result of a driven gear by a measuring mechanism is corrected based on a correction value stored in a storage means beforehand, and therefore, an influence of a backlash existing between a main drive gear and a driven gear can be eliminated completely or approximately. Namely, a high accuracy of the rudder angle sensor is realized. Further, it becomes possible to effectively suppress a large-sizing of the rudder angle sensor because it is not necessary to provide any special mechanism to suppress the backlash between both gears at the main drive gear and the driven gear, and further, at a periphery thereof.

What is claimed is:

1. A rudder angle sensor, which includes: a main drive gear interlocked with a steering shaft to reversibly rotate; a driven gear driven rotating by engaging with the main drive gear; a measuring mechanism measuring a rotation angle of the driven gear; and a calculation means calculating a rotation angle of the steering shaft based on a measured result of the measuring mechanism, said rudder angle sensor comprising:

a storage means for storing a correction value to correct a rotational delay of the driven gear relative to the main drive gear caused by a backlash at a time of a reverse rotation, wherein the calculation means calculates the rotation angle of the steering shaft by correcting the measured result of the measuring mechanism based on the correction value stored in said storage means, the calculation means further comprising an interface for bringing in external data, wherein rotation angle data of the measurement shaft obtained from an encoder provided at the measurement shaft is brought into the calculation means from the interface, when the main drive gear is interlocked with the measurement shaft instead of the steering shaft, and wherein the calculation means calculates the correction value based on the rotation angle data brought in and the measured result of the measuring mechanism.

2. The rudder angle sensor according to claim 1, wherein the measuring mechanism is constituted by including at least a measurement small-diameter gear integrally rotating with the driven gear, and a measurement driven gear driven rotating by engaging with the measurement small-diameter gear, and wherein the correction value to be stored in the storage means is set by including a measurement correction value to correct a rotational delay of the measurement driven gear relative to the measurement small-diameter gear caused by the backlash at the time of the reverse rotation.

* * * * *